United States Patent [19]

Nien

[11] Patent Number: 5,752,416
[45] Date of Patent: May 19, 1998

[54] RETAINING DEVICE FOR A BICYCLE

[76] Inventor: Chang-jen Nien, 2F-5, No. 229, Chinlung Rd., Neihu Dist., Taipei, Taiwan

[21] Appl. No.: 708,353

[22] Filed: Sep. 4, 1996

[51] Int. Cl.$^6$ .......................... E05B 71/00; B62K 21/12
[52] U.S. Cl. .................. 74/551.8; 70/233; 70/18; 70/49
[58] Field of Search ................... 74/551.8; 70/223, 70/18, 30, 49; 280/289

[56] References Cited

U.S. PATENT DOCUMENTS

| | | | |
|---|---|---|---|
| 2,051,822 | 8/1936 | Clarke | 280/289 |
| 3,800,575 | 4/1974 | Perret | 70/233 |
| 3,922,894 | 12/1975 | Johnson | 70/18 |
| 4,060,714 | 11/1977 | Treslo | 70/18 |
| 4,545,224 | 10/1985 | Zane | 70/233 |
| 4,870,843 | 10/1989 | Lundberg | 70/18 X |
| 5,197,310 | 3/1993 | Pederson | 70/233 X |
| 5,289,704 | 3/1994 | Johnson | 70/233 X |
| 5,513,508 | 5/1996 | Saunders et al. | 70/233 |

FOREIGN PATENT DOCUMENTS

| | | | |
|---|---|---|---|
| 7806670 | 12/1979 | Netherlands | 70/233 |
| 90/02074 | 3/1990 | WIPO | 70/233 |

*Primary Examiner*—Vinh T. Luong
*Attorney, Agent, or Firm*—Michaelson & Wallace; Peter L. Michaelson; Michael P. Straub

[57] ABSTRACT

A retaining device used in a bicycle including a body having a stepped recess, an aperture and a slit, a head having a circumferential groove provided on a distal end, two cables whose first distal ends are respectively and securely connected with the body and the head, and two members each respectively and securely connected to second distal ends of the two cables by their respective first ends. Second ends of the two members are pivotally connected with each other. Therefore, after the circumferential groove of the head is received within the stepped recess and the two cables are folded together, the retaining device of the invention is ready to be received within a handlebar of the bicycle.

6 Claims, 5 Drawing Sheets

5,752,416

RETAINING DEVICE FOR A BICYCLE

FIELD OF THE INVENTION

The present invention generally relates to an adjustable retaining device, and more particularly to an adjustable retaining device for a variety of bicycles.

BACKGROUND OF THE INVENTION

Nowadays, with fast growing rate of automobile stolen cases, people are willing to do anything to protect their cars. One usual way is to install a siren device in the cars to scare off thieves. Another way is to have a retaining device to securely lock a steering wheel with an accelerator pedal. (Since installation of the siren device is not the scope of the invention, there will be no detailed discussion about the siren device.) The retaining device used to securely lock the steering wheel with the accelerator pedal, in order to fulfill the distance between the steering wheel and the accelerator pedal, usually has longer length, which increases difficulty in storing said retaining device.

An even more popular retaining device used to lock only the gear shift includes a U shaped locker and a body. The body having a key hole for receiving a key to lock and unlock the locking effect and two through holes for receiving two ends of said U shaped locker. The locking effect of the retaining device constructed as mentioned above is easily damaged if the gear shift is sawed from a stem of the gear shift.

This invention has a particular application to an adjustable retaining device which is used to lock a bicycle and a gear shift together through a reversed J shape stick and a U shaped locker. The stick is pivotally connected with the locker, so that a variety of bicycles with different sizes are all able to be adapted to fit in. Furthermore, due to a tube securely screwed with the stick, the length of the stick, before hooking up with the bicycle, is adjustable.

Consequently, the adjustable retaining device constructed in accordance with the present invention is able to be adapted to fit in all kinds of bicycles and provide a perfect security thereto.

Thus, a hidden retaining device constructed in accordance with the present invention and especially used in a bicycle tends to mitigate and/or obviate the aforementioned problems.

SUMMARY OF THE INVENTION

The main objective of the invention is to provide an adjustable retaining device comprising a body having a recess, and an aperture, a head, two cables whose first distal ends are respectively and securely connected with the body and the head, and two members each respectively and securely connected to second distal ends of the body and the head with respective first end. Second ends of the two members are pivotally connected with each other. Therefore, the retaining device is able to be received within a handlebar by folding together the two cables.

Another objective of the invention is to provide an adjustable hidden retaining device which is not only able to be received within the handlebar, but also is able to be fixedly retained within the handlebar through an internal ridge of the handlebar with a slit of the body.

Other objects, advantages and novel features of the invention will become more apparent from the following detailed description when taken in conjunction with the accompanying drawings.

BRIEF DESCRIPTION OF THE DRAWINGS

The present invention will now be better understood with reference of the accompanying drawings wherein.

DETAILED DESCRIPTION OF THE PREFERRED EMBODIMENT

Figure 1:
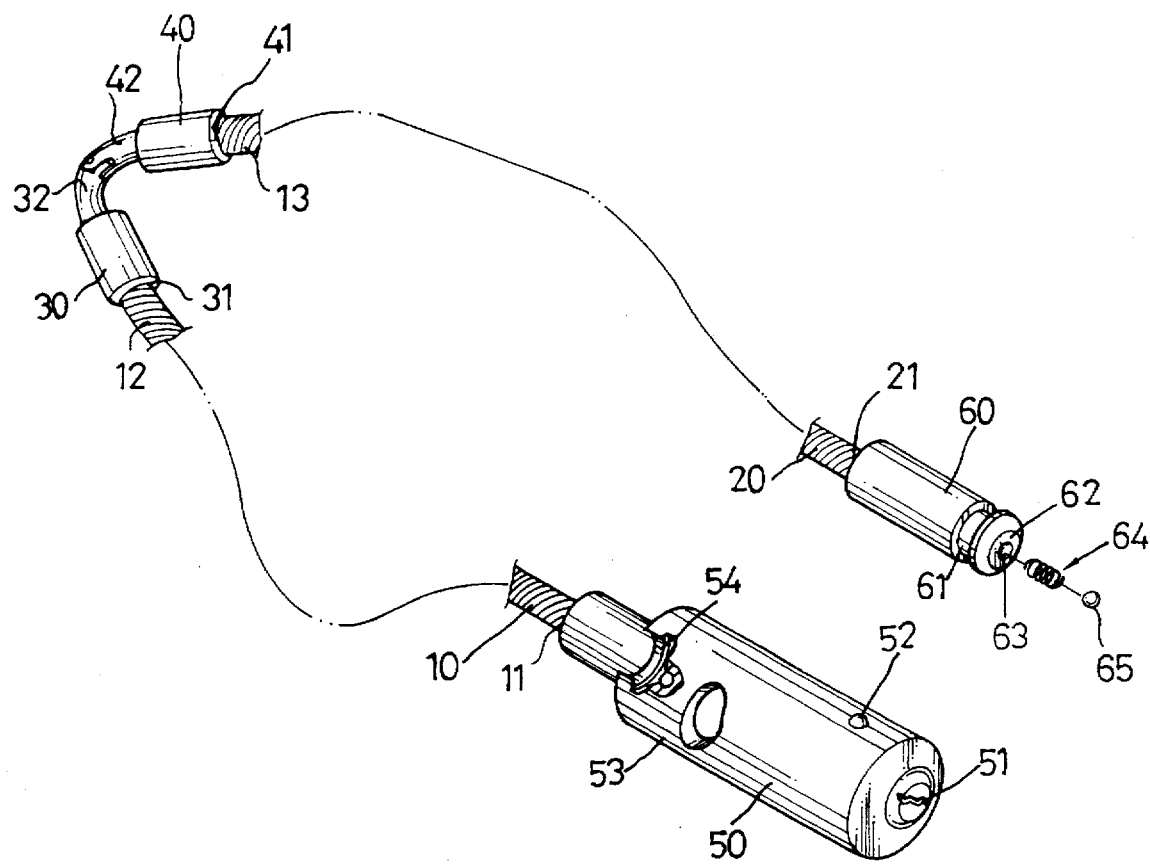
FIG. 1 is a perspective view of one preferred embodiment constructed in accordance with the present invention.
Figure 2:
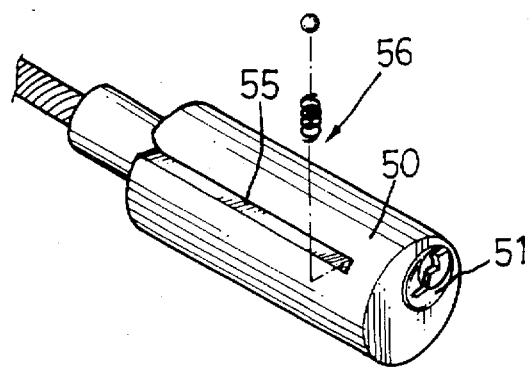
FIG. 2 is another perspective view of a head showing the features of another face.
Figure 3:
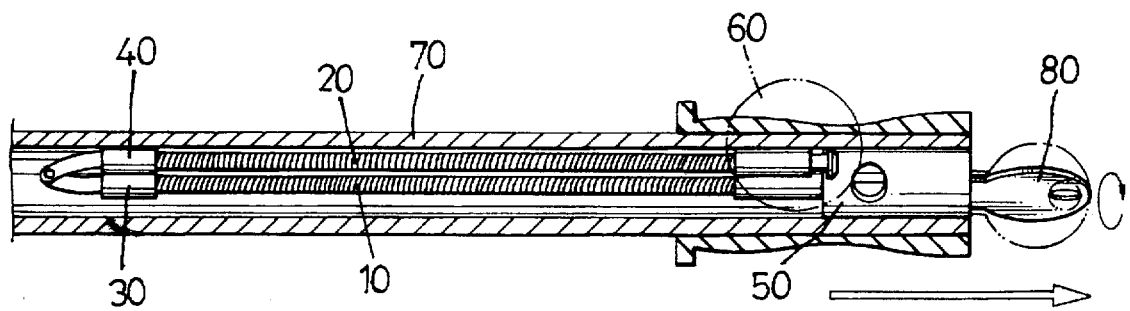
FIG. 3 is a schematic view, partially cut-away of a handlebar together with a folded retaining device received therein.
Figure 4:
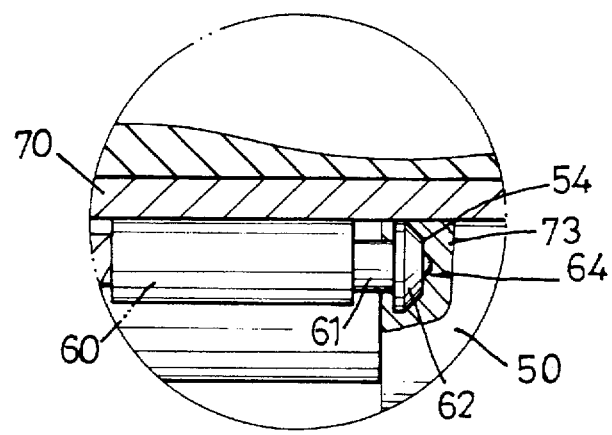
FIG. 4 is a partial enlargement of FIG. 3 showing the relationship between the retaining device and the handlebar.
Figure 5:
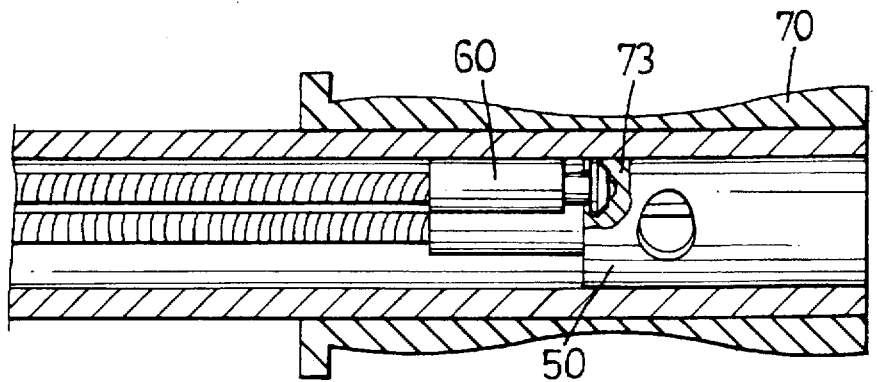
FIG. 5 is a cross sectional view taken along line 6—6 of FIG. 8.

Referring to FIG. 1, one preferred embodiment of the invention is shown. A retaining device constructed in accordance with the present invention comprises a body 50 having a lock barrel 51 which is fixedly received therein, an aperture 53 laterally defined in the body 50 and in communication with the lock barrel 51, a stepped recess 54 also laterally defined in a bottom of the body 50, a head 60, two cables 10, 20, each of which has a first distal end (11, 21) respectively and securely connected with the body 50 and the head 60, and two members 30, 40, each securely connected by respective first ends 31, 41 thereof to second distal ends (12, 12) of the two cables 10, 20. Second ends 32, 42 of the two members 30, 40, are pivotally connected with each other. A first distal end 62 having a slot 63 defined therein of the head 60 is provided with a circumferential groove 61, such that the front part of the head 60 can be received within the stepped recess 54 of the body 50. A retaining element comprising a spring 64 and a ball 65 may be inserted into the slot 63.

Referring to FIGS. 2, 3, 4 and 5, a slit 55 is defined in the body 50 so that the retaining device can be securely housed within a front part of a handlebar 70 by a ridge 73 integrally formed in an inner periphery of the handlebar 70. Furthermore, a retaining element 56 is provided within the slit 55 and adjacent to an close end of the slit 55 with a predetermined distance therebetween. Therefore, after the retaining device is folded together through the mutually pivotally connected members 30, 40, and because the circumferential groove 61 of the head 60 is disposed and received within the stepped recess 54 of the body 50, the retaining device of the invention is ready to be received within the handlebar 70.

Figure 6:
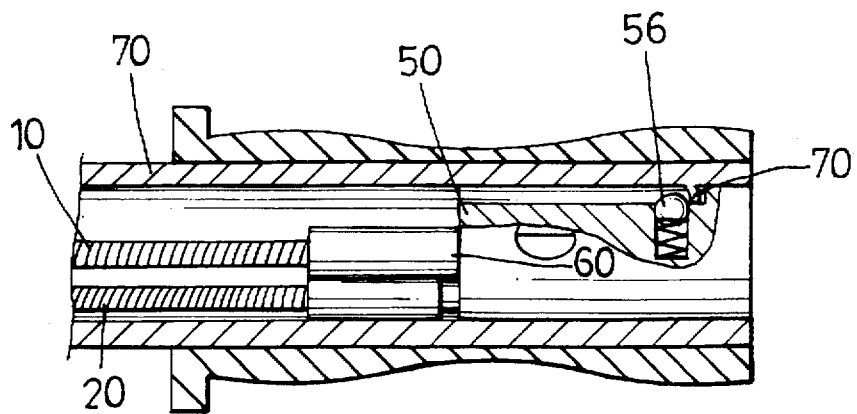
FIG. 6 is a cross sectional vies taken along line 6—6 FIG. 1

When the retaining device of the invention is received within the handlebar 70 through a ridge 73 provided within a periphery of the handlebar 70 and received within the slit 55 of the body 50, the retaining element 56 of the body 50 will be securely abutted by the ridge 73, thus the retaining device of the present invention is securely maintained within the handlebar 70, as shown in FIG. 6.

Figure 7:
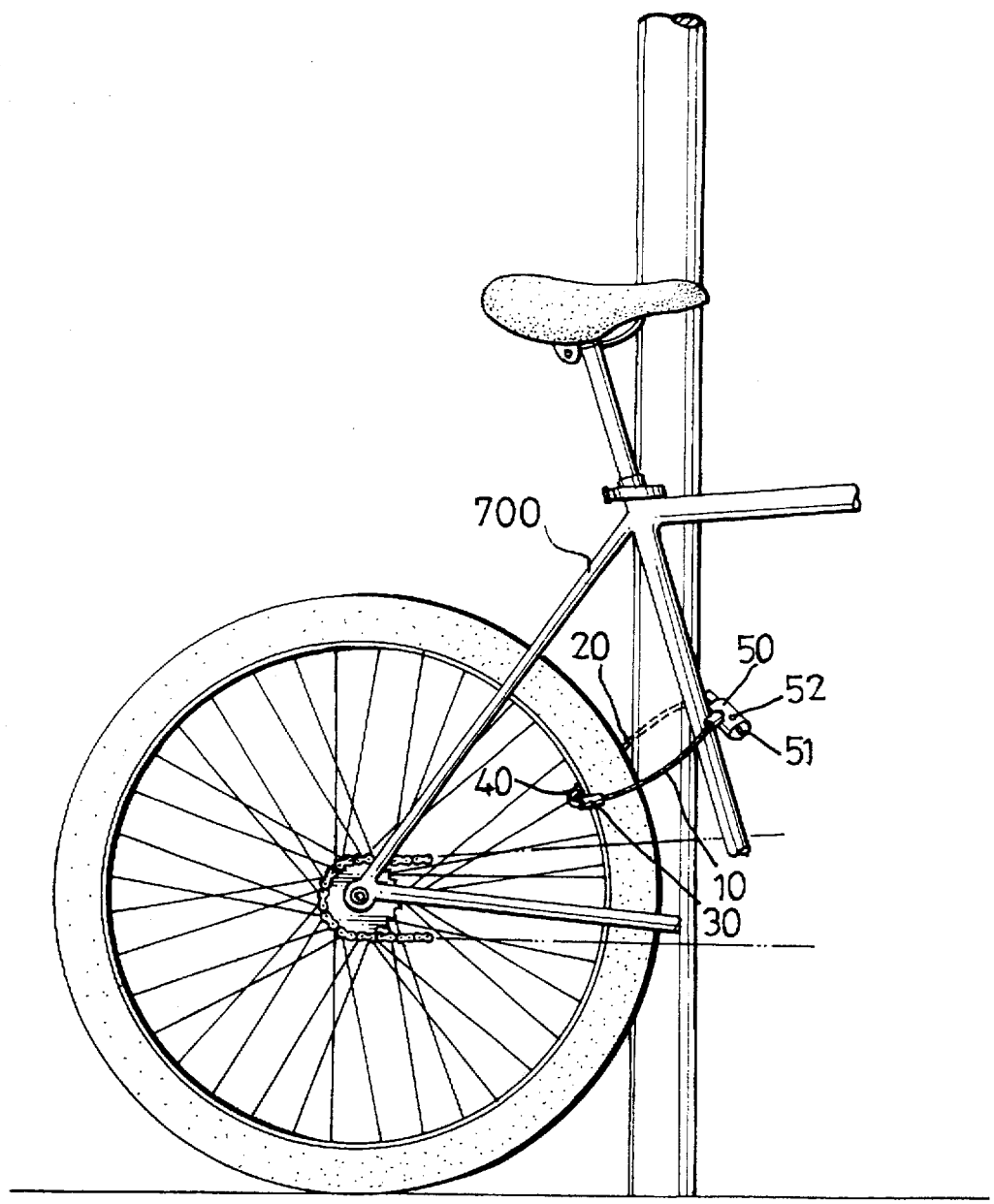
FIG. 7 is a schematic view of the bicycle showing the bicycle is being locked by the retaining device through disposing the head into the aperture of the body.
Figure 8:
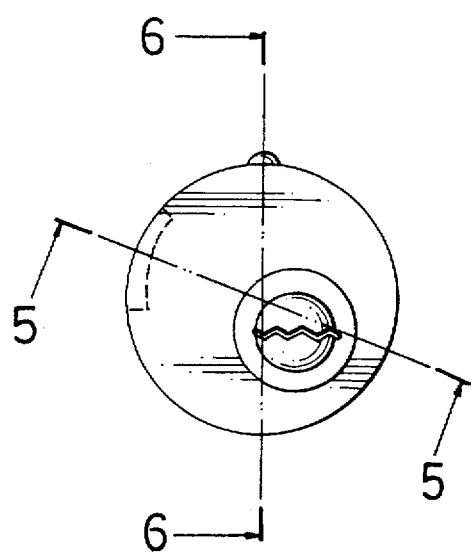
FIG. 8 illustrates the planes upon which the sectional views shown in FIGS. 5 and 6 are taken.

Referring to FIG. 7, when the retaining device of the invention is entirely pulled out from the handlebar 70, it is convenient to lock the bicycle 700 to a post or any other thing by placing the head 60 into the aperture 53 of the body 50.

From the foregoing, it is seen that the objects hereinbefore set forth may readily and efficiently be attained, and since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. An adjustable retaining device for a bicycle, comprising:

a body having a stepped recess, a slit and an aperture defined therein;

a head having a circumferential groove defined in a first distal end thereof and received within said stepped recess;

two cables having first distal ends respectively securely connected with said body and said head; and two members each respectively securely connected to second distal ends of said two cables by their respective first ends, second ends of said two members having second ends pivotally connected with each other.

2. The device as claimed in claim 1, wherein said circumferential groove of said head is fixedly receivable within said aperture.

3. An adjustable retaining device for a bicycle comprising:

a body having a stepped recess, and an aperture defined therein;

a head having a circumferential groove defined in a first distal end therein and received within said stepped recess said head further comprises a slit configured to receive a ridge provided within a bicycle handlebar;

two cables having first distal ends respectively securely connected with said body and said head; and two members each respectively securely connected to second distal ends of said two cables by their respective first ends, second ends of said two members having second ends pivotally connected with each other.

4. An adjustable retaining device for a bicycle, comprising:

a body having a stepped recess, a slit and an aperture defined therein;

a head having a circumferential groove defined in a first distal end thereof and received within said stepped recess;

said head and said slit of said body further respectively including a retaining element provided respectively at the first distal end of said head and a closed end of said slit of said body;

two cables having first distal ends respectively securely connected with said body and said head; and two members each respectively securely connected to second distal ends of said two cables by their respective first ends, second ends of said two members having second ends pivotally connected with each other.

5. The device as claimed in claim 4, wherein said body further has a recess defined within said stepped recess for receiving a retaining element of said head.

6. The device as claimed in claim 5, wherein said retaining element comprises a ball and a spring.

* * * * *